US008983153B2

(12) United States Patent
Neumann et al.

(10) Patent No.: US 8,983,153 B2
(45) Date of Patent: Mar. 17, 2015

(54) METHODS AND APPARATUS FOR COMPARISON

(75) Inventors: Cedric Neumann, Solihull (GB); Ian Evett, Solihull (GB)

(73) Assignee: Forensic Science Service Limited, Birmingham (GB)

( * ) Notice: Subject to any disclaimer, the term of this patent is extended or adjusted under 35 U.S.C. 154(b) by 864 days.

(21) Appl. No.: 13/123,879

(22) PCT Filed: Oct. 19, 2009

(86) PCT No.: PCT/GB2009/002474
§ 371 (c)(1),
(2), (4) Date: Oct. 4, 2011

(87) PCT Pub. No.: WO2010/043872
PCT Pub. Date: Apr. 22, 2010

(65) Prior Publication Data
US 2012/0013439 A1    Jan. 19, 2012

(30) Foreign Application Priority Data

Oct. 17, 2008 (GB) .................................. 0819069.6

(51) Int. Cl.
*G06K 9/00* (2006.01)
(52) U.S. Cl.
CPC .................................. *G06K 9/00093* (2013.01)
USPC .......................................... 382/124; 382/115
(58) Field of Classification Search
USPC ......... 382/124, 100, 115, 125, 181, 224, 228;
716/100, 101, 102, 103, 104, 132;
345/418, 419, 420, 473; 702/127, 179,
702/181; 706/45; 714/100, E11.001,
714/E11.021, E11.03, E11.031, 1, 25, 37,
714/38.1
See application file for complete search history.

(56) References Cited

U.S. PATENT DOCUMENTS

| 4,015,240 | A | 3/1977 | Swonger et al. |
| 5,363,453 | A | 11/1994 | Gagne et al. |

(Continued)

FOREIGN PATENT DOCUMENTS

| EP | 0 636 996 A2 | 2/1995 |
| EP | 0 848 346 A2 | 6/1998 |

(Continued)

OTHER PUBLICATIONS

Bebis, G. et al. "Fingerprint Identification Using Delaunay Triangulation," *Information Intelligence and Systems* (Oct. 31, 1999): 452-459.

(Continued)

*Primary Examiner* — Sheela Chawan
(74) *Attorney, Agent, or Firm* — Merchant & Gould P.C.

(57) ABSTRACT

An apparatus and a computer implemented method compare a first representation of an identifier with a second representation of an identifier to establish a likelihood ratio considering the probability the first representation and second representation originate from the same identifier and the probability of the first representation and second representation originate from different identifiers. The approach generates one or more variant expressions from the first representation, second representation and other representations. A boundary around the expression of the second representation is used to establish the number of the variant expressions of the expression of the first representation within it and the number of variant expressions of the expressions of the other representations within it and so provide the measure of comparison between the first representation of the identifier and the second representation of the identifier from the first value and second value.

30 Claims, 3 Drawing Sheets

(56) References Cited

U.S. PATENT DOCUMENTS

| | | | |
|---|---|---|---|
| 5,469,512 | A | 11/1995 | Fujita et al. |
| 6,243,492 | B1 | 6/2001 | Kamei |
| 6,487,662 | B1 | 11/2002 | Kharon et al. |
| 6,498,861 | B1 * | 12/2002 | Hamid et al. ............... 382/124 |
| 6,594,392 | B2 | 7/2003 | Santoni |
| 6,701,016 | B1 | 3/2004 | Jojic et al. |
| 6,782,120 | B2 * | 8/2004 | Modl et al. ................... 382/124 |
| 6,836,554 | B1 | 12/2004 | Bolle et al. |
| 7,027,624 | B2 | 4/2006 | Monden |
| 7,027,626 | B2 | 4/2006 | Funada |
| RE39,342 | E | 10/2006 | Starks et al. |
| 7,124,066 | B2 | 10/2006 | Marschner et al. |
| 7,151,846 | B1 | 12/2006 | Fujii |
| 7,171,029 | B2 | 1/2007 | Rowe |
| 7,310,446 | B2 | 12/2007 | Kato et al. |
| 7,369,700 | B2 * | 5/2008 | Neumann et al. ............ 382/181 |
| 7,394,918 | B2 | 7/2008 | Mihara et al. |
| 7,397,933 | B2 | 7/2008 | Mihcak et al. |
| 7,512,255 | B2 | 3/2009 | Kakadiaris et al. |
| 7,680,312 | B2 | 3/2010 | Jolly et al. |
| 7,773,784 | B2 * | 8/2010 | Boult .......................... 382/124 |
| 8,494,227 | B2 * | 7/2013 | Prokoski ...................... 382/115 |
| 2002/0136435 | A1 | 9/2002 | Prokoski |
| 2002/0168093 | A1 | 11/2002 | Sanders et al. |
| 2003/0035569 | A1 * | 2/2003 | Chau ............................ 382/124 |
| 2003/0063782 | A1 | 4/2003 | Acharya et al. |
| 2004/0175023 | A1 | 9/2004 | Svedin et al. |
| 2004/0184642 | A1 | 9/2004 | Miyasaka |
| 2004/0197013 | A1 | 10/2004 | Kamei |
| 2004/0202355 | A1 | 10/2004 | Hillhouse |
| 2004/0218789 | A1 | 11/2004 | Polcha et al. |
| 2005/0047676 | A1 | 3/2005 | Kang et al. |
| 2005/0100243 | A1 | 5/2005 | Shum et al. |
| 2006/0104484 | A1 | 5/2006 | Bolle et al. |
| 2006/0126922 | A1 | 6/2006 | Von Berg et al. |
| 2006/0153431 | A1 | 7/2006 | Ando |
| 2006/0222210 | A1 * | 10/2006 | Sundaram .................... 382/115 |
| 2006/0262964 | A1 | 11/2006 | Baggen et al. |
| 2007/0286465 | A1 * | 12/2007 | Takahashi et al. ........... 382/125 |
| 2009/0175506 | A1 * | 7/2009 | Polcha et al. ................. 382/116 |

FOREIGN PATENT DOCUMENTS

| | | |
|---|---|---|
| FR | 2 848 699 A1 | 6/2004 |
| WO | WO 02/097712 A2 | 12/2002 |
| WO | WO 03/085591 A1 | 10/2003 |
| WO | WO 2006/040564 A1 | 4/2006 |
| WO | WO 2006/040573 A1 | 4/2006 |
| WO | WO 2006/040576 A1 | 4/2006 |
| WO | WO 2006/085094 A1 | 8/2006 |

OTHER PUBLICATIONS

Duda, R. et al. "Pattern Classification, Bayesian Decision Theory," *Wiley-Interscience* (2001): 20-83. XP002365513, ISBN: 0-471-05669-3.

Duda, R. et al. "Pattern Classification, Introduction," *Wiley-Interscience*, 1-19 (2001): XP002365512, ISBN: 0-471-05669-3.

IBM, Redbooks Tchnote "External Time Reference (ETR) Requirements for z990"—Abstract, pp. 1-3, available at http://www.redboks.ibm.com/abstracts/tips0217.html?Open, originally published Jun. 19, 2003, last vistited Jan. 11, 2006.

Maltoni, D. et al. "Handbook of Fingerprint Recognition," *Springer Verlag* (Jun. 2003): XP002366505 & XP002365424, ISBN: 0-387-95431-7.

Neumann et al., "Computation of likelihood rations in fingerprint identification for configurations of any number of minutiæ," *J. Forensic Sci.* (2007) 52 (1): 54-64. XP-002598951.

Ross, A. "Information Fusion in Fingerprint Authentication," *Michigan State University, Department of Computer Science & Engineering* (2003).

Ross, A. et al. "A deformable model for fingerprint matching," *The Journal of Pattern Recognition Society* (2005) 38:95-103.

Ross, A. et al. "Estimating Fingerprint Deformation," *Proceedings of the International Conference on Biometric Authentication* (Jul. 2004) 3072: 249-255.

Form PCT/ISA/220 for corresponding International Application No. PCT/GB2009/002474.

Form PCT/ISA/237 for corresponding International Application No. PCT/GB2009/002474.

Form PCT/ISA/210 for corresponding International Application No. PCT/GB2009/002474.

Non-Final Office Action from U.S. Appl. No. 13/007,862 mailed Sep. 5, 2013.

Final Office Action from U.S. Appl. No. 13/271,591 mailed Feb. 22, 2013.

Cowell et al., Probabilistic Networks and Expert Systems: Exact Computational Methods for Bayesian Networks, *Springer Science and Business Media, LLC*, 2007, Chapters 2, 3, and 9.

"Data Mining—The PRONEL Method; PRONEL: Probabilistic Network and Learning", ESPRIT 4 Project 28932, Fourth Framework Programme; <http://www.hugin.com/case-stories/eu-projects/241-data-mining-the-pronel-method>, Hugin Expert A/S, Denmark; Nov. 2012 (12 pgs.).

Lauritzen, Steffen L., "The EM algorithm for graphical association models with missing data." *Computational Statistics & data Analysis 19*, 1995, p. 191-201.

Bazen, A. et al. "Thin-Plate Spline Modelling of Elastic Deformations in Fingerprints," *Proc. 3rd IEEE Benelux Signal Processing Symposium* (Mar. 2002) S02-1-S02-4.

Bebis, G. et al. "Fingerprint Identification Using Delaunay Triangulation," *Information Intelligence and Systems*(Oct. 31, 1999): 452-459.

Duda et al., "Pattern Classification. Chapter 4: Non-parametric techniques," John Wiley & Sons (2001): 161-171, XP-002598952.

* cited by examiner

METHODS AND APPARATUS FOR COMPARISON

This application is a National Stage Application of PCT/GB2009/002474, filed 19 Oct. 2009, which claims benefit of Ser. No. 0819069.6, filed 17 Oct. 2008 in The United Kingdom and which applications are incorporated herein by reference. To the extent appropriate, a claim of priority is made to each of the above disclosed applications.

BACKGROUND OF THE INVENTION

This invention concerns improvements in and relating to methods and apparatus for comparison, particularly, but not exclusively, of one example of a biometric identifier with another to establish the strength of match between them.

In the context of using identity to control access, verification of a person's identity, evidence for legal proceedings and evidence for directing the future conduct of legal investigations, there is a need to establish the strength of match between one example or representation of an identifier and another example or representation. A strong match may allow access or provide evidence of a link. A weak match or lack of match may result in access being denied or evidence of a lack of a link.

The invention has amongst its possible aims to provide methods and apparatus for comparison which seek to provide a more versatile and/or robust and/or accommodating approach to the making of the comparison and the outputs resulting.

SUMMARY OF THE INVENTION

According to a first aspect of the invention we provide a method of comparing a first representation of an identifier with a second representation of an identifier, the method including:

converting the first representation to an expression of the first representation;

generating one or more variant expressions from the expression of the first representation;

converting the second representation to an expression of the second representation;

providing a plurality of other representations and converting each of the other representations to an expression of the other representations;

generating one or more variant expressions from each expression of the plurality of other expressions;

measuring a first separation value, the first separation value being between a first expression and a second expression, the first expression being the expression of the first representation and/or a variant expression of the expression of the first representation, the second expression being the expression of the second representation and/or a variant expression of the second representation;

measuring a second separation value, the second separation value being between a third expression and a fourth expression, the third expression being an expression of one of the plurality of other representations and/or a variant expression of an expression of one of the plurality of other representations, the fourth expression being the expression of the second representation and/or a variant expression of the second representation;

determining a first value, the first value being derived from the combination of one or more first separation values, wherein the first value is weighted according to the values of the first separation values the first value is derived from;

determining a second value, the second value being derived from the combination of one or more second separation values, wherein the second value is weighted according to the values of the second separation values the second value is derived from;

determining a measure of comparison between the first representation of the identifier and the second representation of the identifier from the first value and second value.

The first aspect of the invention may include any of the features, options or possibilities from the second and/or third aspects of the invention and/or from elsewhere in this document.

The method may be computer implemented method.

The identifier may be a biometric identifier. The identifier may be a form of identifier specific to a person or item. The identifier may be a form of mark or marking.

The representation may be a fingerprint, palm print, ear print, retina image or a part of any of these. The representation may be a footprint, shoe print, tool mark or a part of any of these.

The first and/or second representation of the identifier may have been captured. The capture may have occurred from a crime scene and/or an item and/or a location and/or a person.

The first representation may be from the same or a different source as the second representation.

The representation may be obtained by scanning and/or photography. The first and/or second representations of the identifier may be captured in the same or a different way to the other.

The first and/or second representation may be processed prior to conversion to an expression. The processing may have involved converting a colour and/or shaded representation into a black and white representation. The processing may have involved the representation being processed using Gabor filters. The processing may have involved altering the format of the representation. The alteration in format may involve converting the representation into a skeletonised format. The alteration in format may involve converting the representation into a format in which the representation is formed of components, preferably linked data element sets. The alteration may convert the representation into a representation formed of single pixel wide lines. The processing may have involved cleaning the representation, particularly according to one or more of the techniques provided in applicant's UK patent application number 0502893.1 of 11 Feb. 2005 and/or UK patent application number 0422785.6 of 14 Oct. 2004. The processing may have involved healing the representation, particularly according to one or more of the techniques provided in applicant's UK patent application number 0502893.1 of 11 Feb. 2005 and/or UK patent application number 0422785.6 of 14 Oct. 2004. The processing may have involved cleaning of the representation followed by healing of the representation.

The first and/or second representation may be a full or partial representation of the identifier.

Preferably the first representation is obtained from a known person. The known person may be a suspect in legal proceedings. The known person may be a person being added to an access control database. The first representation may be obtained direct from the person or item to which the representation relates.

Preferably the second representation is obtained from an unknown person. The second representation may be obtained from a surface or item or location. The surface or item or location may be at a crime scene. The second representation may be obtained direct from the person or item to which the representation relates. Preferably the second representation is obtained indirectly from the person or item to which it relates.

Preferably the other representations are obtained from a sample of a population. The sample may be of the population of a country. Preferably at least 100, more preferably at least 500, still more preferably at least 1000 and ideally at least 5000 other representations are obtained and/or converted. The other representations may be obtained from different people and/or from different fingers.

The expression of a representation may be a sub-set of the data contained within the representation. The expression may include one or more different types of information present in the representation. The types of information may be or include one or more of ridge ends or bifurcations or the type of minutia.

The expression may be generated by selecting a plurality of features in at least one of the first representation of an identifier and/or the second representation of an identifier; considering the position of one or more of the plurality of features; generating a reference feature from the considered positions of the plurality of features; linking one or more of the features to the reference feature and/or linking one or more of the features to one or more other features in the plurality of features. The expression may be further be generated by extracting data from the representation of the identifier, the extracted data including information on one or more of: one or more of the plurality of features; the reference feature; one or more of the links between a feature and the reference feature; one or more of the links between a feature and another feature.

The expression of the first representation and/or second representation and/or each of the other representations is preferably provided in the same terms.

The method may include generating one or more variant expressions from the expression of the second representation.

A variant expression may be generated from an expression to simulate the effect of a source of variation upon the expression. The source of variation may be distortion, particularly for the first representation and/or the other representations. The source of variation may be distortion of the identifier during the generation of the representation. The source of variation may be the position and/or orientation and/or force applied during the generation of the representation. The source of variation may be differences in interpretation between one person and another person, particularly for the second representation.

Preferably a plurality of variant expressions are generated from the expression. The number of variant expressions generated from the expression may be at least 100, preferably at least 200, more preferably at least 500 and ideally at least 1000.

The variant expressions may be generated experimentally. The variant expressions may be generated by repeat sampling of the identifier to produce variant representations thereof, with those variant representations being converted into variant expressions. More preferably the expression is used to automatically generate the variant expressions. The generation of the variant expressions may be provided via a simulation method. The generation of the variant expressions may be provided by a model, for instance a model of distortion.

The same process may be used to generate the variant expressions for the first expression and for the variant expressions of the other representations.

The variant expressions for the other representations may be pre-generated. The variant expressions for the other representations may be generated before the first representation and/or second representation is obtained and/or converted to an expression and/or have variant expressions generated for them. The variant expressions may be stored in a memory. The variant expressions may be stored in a computer memory or database, particularly a computer implemented database.

The expression and/or the variant expressions, for the first representation and/or second representation and/or other representations, may be vectors, for instance feature vectors. The expression and/or the variant expressions, for the first representation and/or second representation and/or other representations, may have defined positions, for instance in multi-dimensional space.

The first separation value may be expressed as a distance and is preferably a measure of the distance. The distance may be between:
  a) a first expression and a second expression, the first expression being the expression of the first representation, the second expression being the expression of the second representation; and/or
  b) a first expression and a second expression, the first expression being the expression of the first representation, the second expression being a variant expression of the second representation; and/or
  c) a first expression and a second expression, the first expression being a variant expression of the expression of the first representation, the second expression being the expression of the second representation; and/or
  d) a first expression and a second expression, the first expression being a variant expression of the expression of the first representation, the second expression being a variant expression of the second representation.

A first separation value is preferably obtained for:
  a) each pairing of the expression of the first representation and the expression of the second representation; and/or
  b) each pairing of the expression of the first representation and each variant expression of the expression of the second representation; and/or
  c) each pairing of a variant expression of the first representation and the expression of the second representation; and/or
  d) each pairing of a variant expression of the first representation and a variant expression of the second representation.

Ideally, a first separation value is obtained for all four sets of pairings.

The second separation value may be expressed as a distance and is preferably a measure of the distance. The distance may be between:
  a) a third expression and a fourth expression, the third expression being an expression of one of the plurality of other representations, the fourth expression being the expression of the second representation; and/or
  b) a third expression and a fourth expression, the third expression being an expression of one of the plurality of other representations, the fourth expression being a variant expression of the second representation; and/or
  c) a third expression and a fourth expression, the third expression being a variant expression of an expression of one of the plurality of other representations, the fourth expression being the expression of the second representation; and/or
  d) a third expression and a fourth expression, the third expression being a variant expression of an expression of one of the plurality of other representations, the fourth expression being a variant expression of the second representation.

A second separation value is preferably obtained for:
a) each pairing of an expression of one of the other representations and the expression of the second representation; and/or
b) each pairing of an expression of one of the other representations and each variant expression of the expression of the second representation; and/or
c) each pairing of a variant expression of an expression of one of the other representations and the expression of the second representation; and/or
d) each pairing of a variant expression of an expression of one of the other representations and a variant expression of the second representation.

Ideally, a second separation value is obtained for all four sets of pairings.

The first value may be determined by summing the weighting applied to one or more, preferably all, pairs for which a first separation value is provided.

The second value may be determined by summing the weighting applied to one or more, preferably all, pairs for which a second separation is provided.

The weighting for a pair having a first separation value may be defined by a function. The weighting for a pair having a second separation value may be defined by a function. Preferably the same function is used for the weighting of pairs having either a first or a second separation value.

The function preferably varies the weighting value with variation in separation value. Preferably the weighting value for a given separation value is higher than the weighting value given to a second given separation value where the second given separation value is higher than the first separation value. Preferably the weighting value for the second given separation value, ideally for all separation values, is great than zero. The function may vary according to a definition based upon one or more sub-functions. The function may in part be defined by a beta distribution. The function may in part be defined by an exponential distribution. The function may be the mean of an exponential distribution and a beta distribution.

The shape or form of the function may be related to the value of the separation between the expression of the first representation and the expression of the second representation.

The method may include establishing a first probability distribution for one or more of:
1) the expression of the second representation and the expression of the first representation; and/or
2) the expression of the second representation and a variant expression of the expression of the first representation; and/or
3) a variant expression of the expression of the second representation and the expression of the first representation; and/or
4) a variant expression of the expression of the second representation and a variant expression of the expression of the first representation; and/or
5) all pairings formed by pairing types 1), 2), 3) and 4).

The method may include establishing a second probability distribution for one or more of:
1) the expression of the second representation and the expression of one or more of the other representations; and/or
2) the expression of the second representation and one or more of the variant expressions of the expression of one or more of the other representations;
3) a variant expression of the expression of the second representation and the expression of one or more of the other representations; and/or
4) a variant expression of the expression of the second representation and the expression of one or more of the other representations; and/or
5) all pairings formed by pairing types 1) and 2) and potentially all pairings formed by pairing types 1), 2), 3) and 4).

The first probability distribution may relate to the variation between expressions and/or variant expressions from a first identifier and expressions and/or variant expressions from a second identifier.

The second probability distribution may relate to the variation between expressions and/or variant expressions from different identifiers.

The first value may be an expression of the proximity of the expression and/or variant expressions of the first representation to the expression of the second representation.

The second value may be an expression of the proximity of the expression and/or variant expressions of the other representation to the expression of the second representation.

The measure of comparison may be the ratio of the first value to the second value. The measure of comparison may be a likelihood ratio. The likelihood ratio may be the quotient of two probabilities, particularly the numerator being the probability the first representation and second representation originate from the same identifier, particularly the denominator being the probability of the first representation and second representation originate from different identifiers.

The measure of comparison may provide a measure of the strength of match between the first representation and second representation. The measure of comparison may be used to evaluate a hypothesis. The hypothesis may include, particularly as the first consideration, that the first representation and the second representation are from the same source. The hypothesis may include, particularly as the second consideration, that the first representation and the second representation are from different sources.

The use of the first consideration and second consideration to evaluate a hypothesis, may be the evaluation of a first hypothesis, for instance a prosecution hypothesis, and a second hypothesis, for instance a defense hypothesis. The evaluation may be expressed as:

$$LR = \frac{p(x, y \mid H_p, I)}{p(x, y \mid H_d, I)}$$

where x is the first representation and y is the second representation, $H_p$ is one hypothesis for the source of the first and second representations, preferably the prosecution hypothesis that they are from the same identifier, $H_d$ is a second hypothesis for the source of the first and second representations, preferably the defence hypothesis that they are from different identifiers and I is other information relevant to the case.

The use of the first consideration and second consideration to evaluate a hypothesis, may be the evaluation of a first hypothesis, for instance a prosecution hypothesis, and a second hypothesis, for instance a defense hypothesis. The evaluation may be expressed as:

$$LR = \frac{N Pr(y^{(k)} | x^{(k)})}{\sum_{i=1}^{N} Pr(y^{(k)} | z_i^{(k)})}$$

where x is the first representation, y is the second representation, z is the other representations, N is the number of identifier representations in the reference database, k is the number of minutiae considered for an identifier representation. The first hypothesis may be, $H_p$, the hypothesis for the source of the first and second representations, preferably the prosecution hypothesis, that they are from the same identifier. The second hypothesis may be, $H_d$, the hypothesis for the source of the first and second representations, preferably the defence hypothesis, is that they are from different identifiers.

The measure of comparison may provide a measure of the strength of link between the first representation and the second representation in the form of a likelihood ratio. The method may include providing an indication as to whether the first representation is likely to have the same source as the second representation. The indication as to whether the first representation is likely to have the same source as the second representation may be a yes or no indication and/or a quantified indication. The likelihood ratio may be the quotient of two probabilities. One of the probabilities may relate to the probability that the first and second representations came from the same source. One of the probabilities may be that the first and second representations came from different sources.

The measure of comparison, particularly a likelihood ratio, may be used to provide a decision for an access control apparatus.

The measure of comparison, particularly a likelihood ratio, may be used to provide evidence for legal proceedings.

The measure of comparison, particularly a likelihood ratio, may be used to provide evidence or information linking one item and/or location and/or person to another item and/or location and/or person. The measure of comparison may be used to control and/or determine which further method steps to perform According to a second aspect of the invention we provide a computer implemented method of comparing a first representation of an identifier with a second representation of an identifier, the method including:

converting the first representation to an expression of the first representation;

generating one or more variant expressions from the expression of the first representation;

converting the second representation to an expression of the second representation;

providing a plurality of other representations and converting each of the other representations to an expression of the other representations;

generating one or more variant expressions from each expression of the plurality of other expressions;

measuring a first separation value, the first separation value being between a first expression and a second expression, the first expression being the expression of the first representation and/or a variant expression of the expression of the first representation, the second expression being the expression of the second representation and/or a variant expression of the second representation;

measuring a second separation value, the second separation value being between a third expression and a fourth expression, the third expression being an expression of one of the plurality of other representations and/or a variant expression of an expression of one of the plurality of other representations, the fourth expression being the expression of the second representation and/or a variant expression of the second representation;

determining a first value, the first value being derived from the combination of one or more first separation values, wherein the first value is weighted according to the values of the first separation values the first value is derived from;

determining a second value, the second value being derived from the combination of one or more second separation values, wherein the second value is weighted according to the values of the second separation values the second value is derived from;

determining a measure of comparison between the first representation of the identifier and the second representation of the identifier from the first value and second value.

The second aspect of the invention may include any of the features, options or possibilities from the first and/or third aspects of the invention and/or from elsewhere in this document.

According to a third aspect of the invention we provide apparatus for comparing a first representation of an identifier with a second representation of an identifier, the apparatus including:

an input channel for receiving an expression of the first representation, and optionally a unit adapted to convert the first representation into an expression of the first representation;

a data processor adapted to generate one or more variant expressions from the expression of the first representation;

an input channel for receiving an expression of the second representation, and optionally a unit adapted to convert the second representation to an expression of the second representation;

an input channel for receiving and/or data storage unit for storing an expression of a plurality of other representations, and optionally a unit adapted to convert the plurality of other representations into expressions of the other representations;

a data processor adapted to generate one or more variant expressions from each expression of the plurality of other expressions;

a data processor adapted to calculate a first separation value, the first separation value being between a first expression and a second expression, the first expression being the expression of the first representation or a variant expression of the expression of the first representation, the second expression being the expression of the second representation and/or a variant expression of the expression of the second representation;

a data processor adapted to calculate a second separation value, the second separation value being between a third expression and a fourth expression, the third expression being an expression of one of the plurality of other representations and/or a variant expression of an expression of one of the plurality of other representations, the fourth expression being the expression of the second representation and/or a variant expression of the expression of the second representation;

a data processor adapted to determine a first value, the first value being derived from the combination of one or more first separation values, wherein the first value is weighted according to the values of the first separation values the first value is derived from;

a data processor adapted to determine a second value, the second value being derived from the combination of one or more second separation values, wherein the second value is weighted according to the values of the second separation values the second value is derived from;

a data processor adapted to determining a measure of comparison between the first representation of the identifier and the second representation of the identifier from the first value and second value, and optionally an output channel for expressing the measure of comparison.

The data processor may be the same data processor for one or more or all of the data processors listed.

The data processor may use a stored algorithm and/or model to generate the variant expressions from the first representation and/or plurality of other representations.

The unit adapted to convert the first representation into an expression of the first representation may include an image scanner. The unit and/or device may include a user interface, particularly a user interface for selecting features of the first representation to be included in the expression of the first representation. The unit and/or device may include a data storage unit to provide a record of the selected features. The device may include an output unit for producing a record of the selected features, for instance an image.

The unit adapted to convert the second representation into an expression of the second representation may include an image scanner. The unit and/or device may include a user interface, particularly a user interface for selecting features of the second representation to be included in the expression of the second representation. The unit and/or device may include a data storage unit to provide a record of the selected features. The device may include an output unit for producing a record of the selected features, for instance an image.

The unit adapted to convert the plurality of other representations into expressions of the plurality of other representations may include an image scanner. The unit and/or device may include a user interface, particularly a user interface for selecting features of the other representations to be included in the expression of the other representations.

One or more of the units and/or data storage units may be connected to the device electronically, for instance via an Internet link or other telecommunications link, particularly when the device provides one or more of the units and/or data storage units at a different location to the device. The different locations may be different buildings.

The apparatus may include a unit provided at a location, one or more units provided at other locations, a device provided at a further location, one or more further devices provided at one or more further locations and, ideally, a data storage unit for the expressions of the plurality of other representations provided at another location. The location, other locations, further location, one or more further locations and, ideally, another location are preferably different from each other.

The third aspect of the invention may include any of the features, options or possibilities from the first and/or second aspects of the invention and/or from elsewhere in this document.

According to a fourth aspect of the invention we provide a method of comparing a first representation of an identifier with a second representation of an identifier, the method including:

converting the first representation to an expression of the first representation;

generating one or more variant expressions from the expression of the first representation;

converting the second representation to an expression of the second representation;

providing a plurality of other representations and converting each of the other representations to an expression of the other representations;

generating one or more variant expressions from each expression of the plurality of other expressions;

defining a boundary with respect to the expression of the second representation, the boundary defining a space inside that boundary;

determining a first value, the first value being an expression of the number of the variant expressions of the expression of the first representation within the space defined by the boundary;

determining a second value, the second value being an expression of the number of variant expressions of the expressions of the other representations within the space defined by the boundary;

determining a measure of comparison between the first representation of the identifier and the second representation of the identifier from the first value and second value.

The fourth aspect of the invention may include any of the features, options or possibilities from the fifth and/or sixth aspects of the invention and/or from elsewhere in this document.

The method may be computer implemented method.

The identifier may be a biometric identifier. The identifier may be a form of identifier specific to a person or item. The identifier may be a form of mark or marking.

The representation may be a fingerprint, palm print, ear print, retina image or a part of any of these. The representation may be a footprint, shoe print, tool mark or a part of any of these.

The first and/or second representation of the identifier may have been captured. The capture may have occurred from a crime scene and/or an item and/or a location and/or a person.

The first representation may be from the same or a different source as the second representation.

The representation may be obtained by scanning and/or photography. The first and/or second representations of the identifier may be captured in the same or a different way to the other.

The first and/or second representation may be processed prior to conversion to an expression. The processing may have involved converting a colour and/or shaded representation into a black and white representation. The processing may have involved the representation being processed using Gabor filters. The processing may have involved altering the format of the representation. The alteration in format may involve converting the representation into a skeletonised format. The alteration in format may involve converting the representation into a format in which the representation is formed of components, preferably linked data element sets. The alteration may convert the representation into a representation formed of single pixel wide lines. The processing may have involved cleaning the representation, particularly according to one or more of the techniques provided in applicant's UK patent application number 0502893.1 of 11 Feb. 2005 and/or UK patent application number 0422785.6 of 14 Oct. 2004. The processing may have involved healing the representation, particularly according to one or more of the techniques provided in applicant's UK patent application number 0502893.1 of 11 Feb. 2005 and/or UK patent application number 0422785.6 of 14 Oct. 2004. The processing may have involved cleaning of the representation followed by healing of the representation.

The first and/or second representation may be a full or partial representation of the identifier.

Preferably the first representation is obtained from a known person. The known person may be a suspect in legal proceedings. The known person may be a person being added to an access control database. The first representation may be obtained direct from the person or item to which the representation relates.

Preferably the second representation is obtained from an unknown person. The second representation may be obtained from a surface or item or location. The surface or item or location may be at a crime scene. The second representation may be obtained direct from the person or item to which the representation relates. Preferably the second representation is obtained indirectly from the person or item to which it relates.

Preferably the other representations are obtained from a sample of a population. The sample may be of the population of a country. Preferably at least 100, more preferably at least 500, still more preferably at least 1000 and ideally at least 5000 other representations are obtained and/or converted. The other representations may be obtained from different people and/or from different fingers.

The expression of a representation may be a sub-set of the data contained within the representation. The expression may include one or more different types of information present in the representation. The types of information may be or include one or more of ridge ends or bifurcations or the type of minutia.

The expression may be generated by selecting a plurality of features in at least one of the first representation of an identifier and/or the second representation of an identifier; considering the position of one or more of the plurality of features; generating a reference feature from the considered positions of the plurality of features; linking one or more of the features to the reference feature and/or linking one or more of the features to one or more other features in the plurality of features. The expression may be further be generated by extracting data from the representation of the identifier, the extracted data including information on one or more of: one or more of the plurality of features; the reference feature; one or more of the links between a feature and the reference feature; one or more of the links between a feature and another feature.

The expression of the first representation and/or second representation and/or each of the other representations is preferably provided in the same terms.

A variant expression may be generated from an expression to simulate the effect of a source of variation upon the expression. The source of variation may be distortion. The source of variation may be distortion of the identifier during the generation of the representation. The source of variation may be the position and/or orientation and/or force applied during the generation of the representation.

Preferably a plurality of variant expressions are generated from the expression. The number of variant expressions generated from the expression may be at least 100, preferably at least 200, more preferably at least 500 and ideally at least 1000.

The variant expressions may be generated experimentally. The variant expressions may be generated by repeat sampling of the identifier to produce variant representations thereof, with those variant representations being converted into variant expressions. More preferably the expression is used to automatically generate the variant expressions. The generation of the variant expressions may be provided via a simulation method. The generation of the variant expressions may be provided by a model, for instance a model of distortion.

The same process may be used to generate the variant expressions for the first expression and for the variant expressions of the other representations.

The variant expressions for the other representations may be pre-generated. The variant expressions for the other representations may be generated before the first representation and/or second representation is obtained and/or converted to an expression and/or have variant expressions generated for them. The variant expressions may be stored in a memory. The variant expressions may be stored in a computer memory or database, particularly a computer implemented database.

The boundary may be provided around the expression of the second representation. The boundary may have the same extent about the expression of the second representation in two or more dimensions. The boundary may have the same extent about the expression of the second representation in each dimension. The boundary may have a different extent about the expression of the second representation in one or more dimensions, for instance in comparison to one or more of the other dimensions.

The extent of the boundary may be a radius. The extent of the boundary may be a given distance.

The space defined within the boundary may have a regular shape and/or extent and/or volume. The space defined within the boundary may have an irregular shape and/or extent and/or volume.

The space defined by the boundary may define a bin.

The method may include determining a relationship, for instance the distance, between one or more of:
  the expression of the second representation and the expression of the first representation; and/or
  the expression of the second representation and one or more of the variant expressions of the expression of the first representation; and/or
  the expression of the second representation and the expression of one or more of the other representations; and/or
  the expression of the second representation and one or more of the variant expressions of one or more of the expressions of the other representations; potentially, for one or more of these pairings.

The method may include establishing a first probability distribution for one or more of:
  the expression of the second representation and the expression of the first representation; and/or
  the expression of the second representation and one or more of the variant expressions of the expression of the first representation.

The method may include establishing a second probability distribution for one or more of:
  the expression of the second representation and the expression of one or more of the other representations; and/or
  the expression of the second representation and one or more of the variant expressions of one or more of the expressions of the other representations; potentially, for one or more of these pairings.

The first probability distribution may relate to the variation between expressions and/or variant expressions from the same identifier.

The second probability distribution may relate to the variation between expressions and/or variant expressions from different identifiers.

The first value may be an expression of the proximity of the expression and/or variant expressions of the first representation to the expression of the second representation. The first value may be an expression of the proportion of the expression and/or variant expression of the first representation within the space defined by the boundary. The expression of the proportion may be compared with the total number of expression and/or variant expressions for the first representation. The first value may be the number of expression and/or variant expressions of the first representation within the space defined by the boundary divided by the total number of expression and/or variant expressions for the first representation.

The second value may be an expression of the proximity of the expression and/or variant expressions of the other representation to the expression of the second representation. The second value may be an expression of the proportion of the expressions and/or variant expressions of the other representations within the space defined by the boundary. The expression of the proportion may be compared with the total number of expressions and/or variant expressions for the other representations. The second value may be the number of expressions and/or variant expressions of the other representations within the space defined by the boundary divided by the total number of expressions and/or variant expressions for the other representations.

The measure of comparison may be the ratio of the first value to the second value. The measure of comparison may be a likelihood ratio. The likelihood ratio may be the quotient of two probabilities, particularly the numerator being the probability the first representation and second representation originate from the same identifier, particularly the denominator being the probability of the first representation and second representation originate from different identifiers.

The measure of comparison may provide a measure of the strength of match between the first representation and second representation. The measure of comparison may be used to evaluate a hypothesis. The hypothesis may include, particularly as the first consideration, that the first representation and the second representation are from the same source. The hypothesis may include, particularly as the second consideration, that the first representation and the second representation are from different sources.

The use of the first consideration and second consideration to evaluate a hypothesis, may be the evaluation of a first hypothesis, for instance a prosecution hypothesis, and a second hypothesis, for instance a defense hypothesis. The evaluation may be expressed as:

$$LR = \frac{p(x, y | H_p, I)}{p(x, y | H_d, I)}$$

where x is the first representation and y is the second representation, $H_p$ is one hypothesis for the source of the first and second representations, preferably the prosecution hypothesis that they are from the same identifier, $H_d$ is a second hypothesis for the source of the first and second representations, preferably the defence hypothesis that they are from different identifiers and I is other information relevant to the case.

The measure of comparison may provide a measure of the strength of link between the first representation and the second representation in the form of a likelihood ratio. The method may include providing an indication as to whether the first representation is likely to have the same source as the second representation. The indication as to whether the first representation is likely to have the same source as the second representation may be a yes or no indication and/or a quantified indication. The likelihood ratio may be the quotient of two probabilities. One of the probabilities may relate to the probability that the first and second representations came from the same source. One of the probabilities may be that the first and second representations came from different sources.

The measure of comparison, particularly a likelihood ratio, may be used to provide a decision for an access control apparatus.

The measure of comparison, particularly a likelihood ratio, may be used to provide evidence for legal proceedings.

The measure of comparison, particularly a likelihood ratio, may be used to provide evidence or information linking one item and/or location and/or person to another item and/or location and/or person. The measure of comparison may be used to control and/or determine which further method steps to perform.

According to a fifth aspect of the invention we provide a computer implemented method of comparing a first representation of an identifier with a second representation of an identifier, the method including:

converting the first representation to an expression of the first representation;

generating one or more variant expressions from the expression of the first representation;

converting the second representation to an expression of the second representation;

providing a plurality of other representations and converting each of the other representations to an expression of the other representations;

generating one or more variant expressions from each expression of the plurality of other expressions;

defining a boundary with respect to the expression of the second representation, the boundary defining a space inside that boundary;

determining a first value, the first value being an expression of the number of the variant expressions of the expression of the first representation within the space defined by the boundary;

determining a second value, the second value being an expression of the number of variant expressions of the expressions of the other representations within the space defined by the boundary;

determining a measure of comparison between the first representation of the identifier and the second representation of the identifier from the first value and second value.

The fifth aspect of the invention may include any of the features, options or possibilities from the fourth and/or sixth aspects of the invention and/or from elsewhere in this document.

According to a sixth aspect of the invention we provide apparatus for comparing a first representation of an identifier with a second representation of an identifier, the apparatus including:

an input channel for receiving an expression of the first representation, and optionally a unit adapted to convert the first representation into an expression of the first representation;

a data processor adapted to generate one or more variant expressions from the expression of the first representation;

an input channel for receiving an expression of the second representation, and optionally a unit adapted to convert the second representation to an expression of the second representation;

an input channel for receiving and/or data storage unit for storing an expression of a plurality of other representations, and optionally a unit adapted to convert the plurality of other representations into expressions of the other representations;

a data processor adapted to generate one or more variant expressions from each expression of the plurality of other expressions;

a data processor adapted to calculate and/or for obtain from a data storage unit a definition of a boundary with respect to the expression of the second representation, the boundary defining a space inside that boundary;

a data processor adapted to determine a first value, the first value being an expression of the number of the variant expressions of the expression of the first representation within the space defined by the boundary;

a data processor adapted to determine a second value, the second value being an expression of the number of variant expressions of the expressions of the other representations within the space defined by the boundary;

a data processor adapted to determining a measure of comparison between the first representation of the identifier and the second representation of the identifier from the first value and second value, and optionally an output channel for expressing the measure of comparison.

The data processor may be the same data processor for one or more or all of the data processors listed.

The data processor may use a stored algorithm and/or model to generate the variant expressions from the first representation and/or plurality of other representations.

The unit adapted to convert the first representation into an expression of the first representation may include an image scanner. The unit and/or device may include a user interface, particularly a user interface for selecting features of the first representation to be included in the expression of the first representation. The unit and/or device may include a data storage unit to provide a record of the selected features. The device may include an output unit for producing a record of the selected features, for instance an image.

The unit adapted to convert the second representation into an expression of the second representation may include an image scanner. The unit and/or device may include a user interface, particularly a user interface for selecting features of the second representation to be included in the expression of the second representation. The unit and/or device may include a data storage unit to provide a record of the selected features. The device may include an output unit for producing a record of the selected features, for instance an image.

The unit adapted to convert the plurality of other representations into expressions of the plurality of other representations may include an image scanner. The unit and/or device may include a user interface, particularly a user interface for selecting features of the other representations to be included in the expression of the other representations.

One or more of the units and/or data storage units may be connected to the device electronically, for instance via an Internet link or other telecommunications link, particularly when the device provides one or more of the units and/or data storage units at a different location to the device. The different locations may be different buildings.

The apparatus may include a unit provided at a location, one or more units provided at other locations, a device provided at a further location, one or more further devices provided at one or more further locations and, ideally, a data storage unit for the expressions of the plurality of other representations provided at another location. The location, other locations, further location, one or more further locations and, ideally, another location are preferably different from each other.

The sixth aspect of the invention may include any of the features, options or possibilities from the fourth and/or fifth aspects of the invention and/or from elsewhere in this document.

BRIEF DESCRIPTION OF THE DRAWINGS

Various embodiments of the invention will now be described, by way of example only, with reference to the accompanying drawings, in which.

DETAILED DESCRIPTION OF THE INVENTION

In many situations, it is necessary to compare a identifier representation with another identifier representation to establish whether or not, or the likelihood, that the two identifier representations were generated by the same source. The same source could be a finger, with one identifier representation being collected in controlled circumstances from the finger and the another identifier representation being collected in other circumstances. The other circumstances could be a fingerprint collected from a crime scene and then analysed or a fingerprint taken from a scanner used as part of an identity recognition system. The identifier representations may present the data in various ways and forms. Examples include the minutiae type, distance between pairs of minutiae and the angle of those distances.

The comparison between one identifier representation and the another identifier representation needs to be made quickly and effectively for the comparison system to operate successfully.

Figure 1:
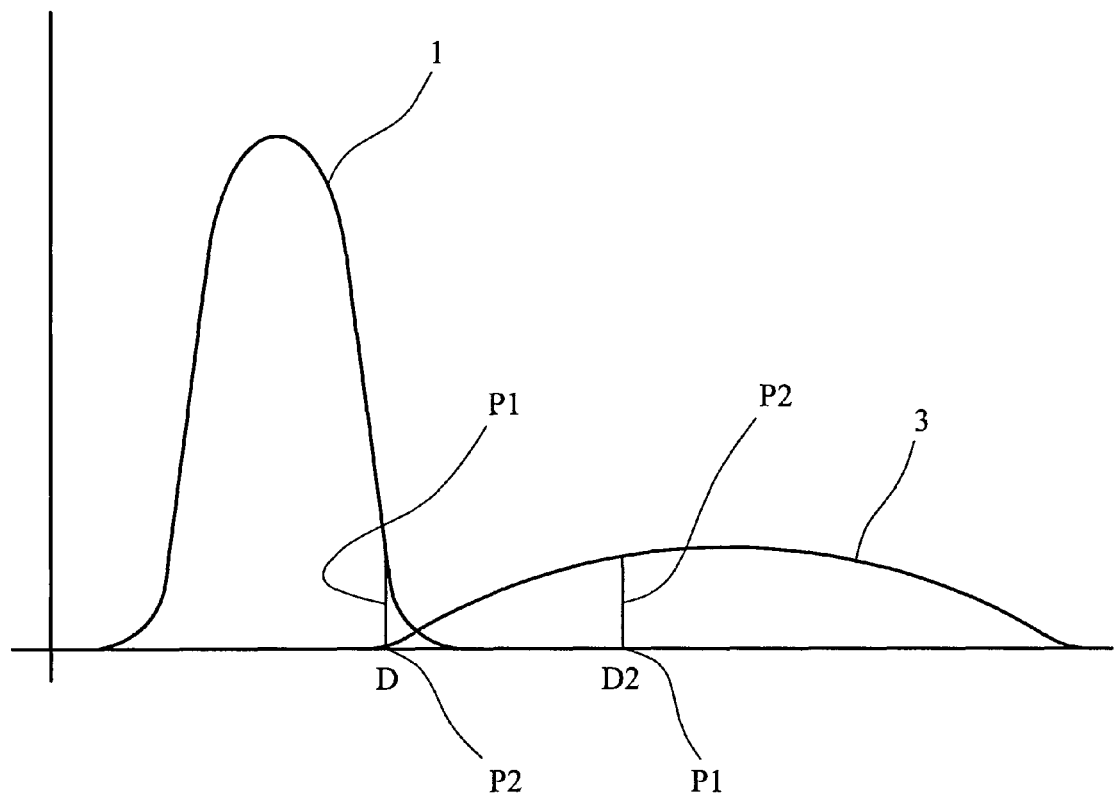
FIG. 1 is an illustration of a prior art approach to the comparison of two identifier representations and establishing the likelihood ratio for potential sources thereof.

One method of making the comparison, described in detail in WO2006/040573, is illustrated with reference to FIG. 1. Two different probability distributions are employed.

The first probability distribution 1, is an expression of the variability between identifier representations taken from the same source. Whilst orientation, distortion and other factors will cause variability between identifier representations, even when taken from the same source, the probability distribution 1 is fairly tightly ranged. These are the many distances considered between different pairs of points x in the explanation of the present invention; x to x distances.

The second probability distribution 3, is an expression of the variability between identifier representations taken from different sources. In these cases, differences in the minutiae type present, their separation and their orientation to one another, alongside other factors, all cause a wide range of variation between identifier representations and hence a widely spread probability distribution 2. These are the many distances considered between the single point y and single expressions of the different reference points z (for instance y to $z_1$, y to $z_2$ etc) in the explanation of the present invention; y to z distances.

The above mentioned variation between identifier representations may conveniently be established by comparing the identifier representations in such a way that the difference can be expressed as a distance. This distance is then plotted along one axis, with the probability on the other axis.

When it comes to comparing a identifier representation from a source with another identifier representation to see if they are likely to have come from the same source, the two are compared and a distance D is obtained. This distance D can then be applied to the plot of FIG. 1 and a likelihood obtained by considering the ratio of the probability that identifier representations with that distance between them came from the same source, P1, with the probability that identifier representations with that distance between them came from different sources, P2. This is the distance considered between the single point y and single point x in the explanation of the present invention; y to x distance.

In the case of distance D, the probability value for P1 is far higher than for P2 and so the same source is the more likely position. In the case of a second example, distance D2, then the value of P1 is very small and the value of P2 is appreciable, thus giving different sources as the more likely position.

Such an approach is useful in giving a strength of match indication between identifier representations. However, the comparison approach would be improved by an approach which was more robust and/or quicker to implement.

Embodiment One

Figure 2:
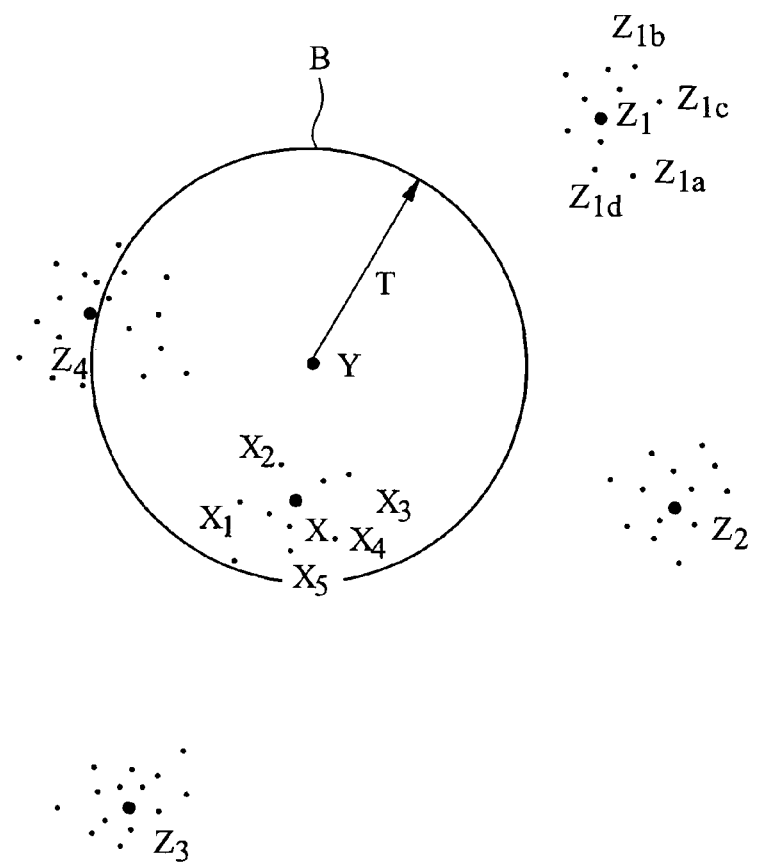
FIG. 2 is a schematic illustration useful for understanding the implementation of the present invention, showing the population of space with points representing an identifier representation and distorted versions thereof.

In an alternative approach of the present invention a different methodology is used. FIG. 2 provides a figurative illustration useful for understanding that methodology.

An identifier representation is obtained from a finger and expressed as a point in space, $z_1$. Various approaches can be taken to the collection, processing and expression of the identifier representation, with the approach detailed in WO2006/085094 being preferred. Details of this approach are provided in Appendix A below.

The possible variation in this identifier representation between repeat samplings from the same finger is then considered. In effect, the impact of distortion upon the source is considered. This results in a cluster of further points, $z_{1a}$, $z_{1b}$, $z_{1c}$, $z_{1d}$ etc around point $z_1$. This differs significantly from the prior art, where $z_1$ only is considered and no repeat samplings of $z_1$ are considered. A small number of such points are shown in FIG. 2 to represent the position schematically, but a large number of such points can be obtained.

It is possible to obtain the identifier representation behind each point experimentally from the finger by repeated sampling without controlling the manner in which the finger is sample (hence distortion will occur). However, the applicant has developed an automated technique for simulating the effect of distortion which is far quicker to implement than a physical sampling approach. Details of this technique are set out in the Appendix B below.

This process is repeated for a large number of different identifier representations obtained from different fingers of different people so as to provide a large number of different first points, z. In the schematic illustration of FIG. 2, further identifier representations $z_2$, $z_3$ and $z_4$ are employed to generate point clusters $z_{b1}, z_{b2}, z_{b3}; z_{c1}, z_{c2}, z_{c3}; z_{d1}, z_{d2}$ etc about their respective points, z. This gives a significant increase in the number of points compared with the prior art mentioned above. Rather than just having the number of points $z_1$ to $z_n$, the number of point is multiplied by the number of samplings of each point, $z_{11}$ to $z_{1n}$.

In this space, it is then possible to consider the two identifier representations of interest, which in this example are a fingerprint taken from a person, a suspect in a crime, and a fingerprint taken from a crime scene.

The fingerprint from the crime scene is used to generate a identifier representation which is then expressed as a point, y. No distortion of this point y needs to be simulated and no further points clustered around it are needed.

The fingerprint from the suspect is also used to generate a identifier representation and hence a point, x. A set of points $x_1$, $x_2$, $x_3$ etc clustered around this point x are then generated, preferably by the same approach as is taken to generate the clusters around the points $z_1$, $z_2$ etc.

The distance between point y and each of the points for a cluster is then established.

Figure 3:
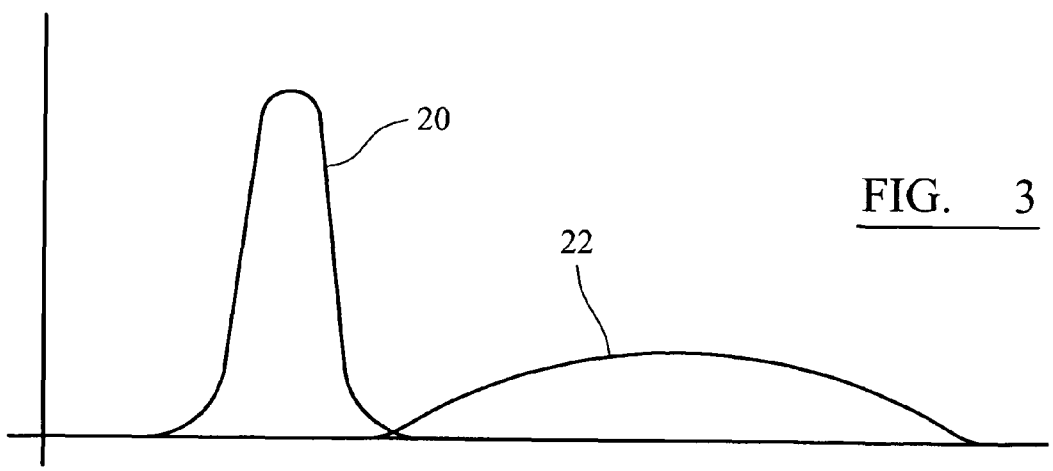
FIG. 3 is an illustration of the form of probability distributions involved in an embodiment of the present invention.

Thus for cluster $z_1$ in FIG. 2, distances y to $z_{1a}$; y to $z_{1b}$; y to $z_{1c}$; y to $z_{1d}$ etc are all established. Distances are established in a similar way between y and the other points, $z_{ea}$ etc. Hence, a far greater number of y to z distances are taken. Referring to FIG. 3, the variation in these distances (y to z) and the frequency of occurrence gives a probability distribution 22. This is a fairly widespread distribution reflecting the wide variety of fingerprints which are behind the identifier representations for which the distance z to y has been established.

In a similar manner, the distance between point y and each of the points for the cluster about point x is also established. Thus distances y to x; y to $x_1$; y to $x_2$ etc are all established. In the prior art mentioned above, the x to x distances are considered. Referring to FIG. 3, the variation in these distances and their frequency of occurrence give a probability distribution 20. This is a more tightly defined distribution reflecting the single fingerprint which is behind all the identifier representations for which the distance to m has been established.

Having achieved the above, a bin B around point y is defined. In the example of FIG. 2, this is at distance T which is equal in all directions about point y. The number of points from the suspect's cluster, x, $x_1$, $x_2$ etc, that fall within the bin B is established. The number of points from the other clusters, $z_1$, $z_2$, $z_3$ etc, that fall within the bin B are also established.

The likelihood ratio arrived it is the ratio of the number of points from the suspect's cluster x within the bin B compared with the total number of points in the suspect's cluster compared to the ratio of the number of points from non-suspect clusters z within the bin B compared with the total number of points in the non-suspect clusters z.

The above approach can also be expressed mathematically, as follows. The likelihood ratio, LR, of interest is effectively the probability of the first mark, and its identifier representation represented by point x, and the second mark, and its identifier representation represented by point y, occurring given the prosecution's hypothesis, $H_p$, (normally the crime scene mark, y, came from the suspect whose fingerprint was used to generate x, $x_1$ etc) and given other relevant information to the case, I, to the probability of x and y, occurring given the defences's hypothesis, $H_p$, (normally the crime scene mark, y, came from someone other than suspect whose fingerprint was used to generate x, $x_1$ etc) and given other relevant information to the case, I. This can be expressed as:

$$LR = \frac{p(x, y \mid H_p, I)}{p(x, y \mid H_d, I)}$$

This function can be expressed as:

$$LR = \frac{p(y \mid x, H_p, I)}{p(y \mid x, H_d, I)} \cdot \frac{p(x \mid H_p, I)}{p(x \mid H_d, I)}$$

The following assumptions are now made:

$p(x|H_p,I) = p(x|H_d,I)$ $p(y|x,H_d,I) = p(y|H_d,I)$

Provided these are true:

$$LR = \frac{p(y | x, H_p, I)}{p(y | H_d, I)}$$

By changing the notation slightly, this can be reexpressed as:

$$LR = \frac{p(Y = y | X = x, H_p, I)}{p(Y = y | H_d, I)}$$

This in turn can be approximated by the form:

$$LR = \frac{Pr(Y \in B(y) | X = x, H_p, I)}{Pr(Y \in B(y) | H_d, I)}$$

where B(y) is a bin centred on y such that any value z that satisfies d (z, y)≤T is contained in the bin. Here d (z, y) is the distance measured by the usual metric and T is a threshold value that could be a function of inter-examiner variability. This could be determined by experiment to satisfy an optimisation criterion.

In order to calculate the last function, the numerator and denominator are handled as follows.

The numerator is defined by starting with x and generating a set $\{z_1, z_2, \ldots z_M\}$ of M number k-configurations (where M is the number in the set and k is the number of minutiae considered for each) using the distortion model mentioned above. By considering m to be the number of z's that are within the bin because they satisfy the requirement d (z, y)≤T, then the numerator becomes the ratio m/M.

The denominator is defined by starting with a member of the database, a point z, and generating the set of k-configurations about that point using the distortion model; set $\{z_{i1}, z_{i2}, \ldots z_{iM}\}$. This is repeated for all M of the points z. This gives an aggregate number of points $z_i$ from the consideration of all the points z and their associated distorted points, that satisfy the requirement d (z, y)≤T. This allows the denominator to be expressed as:

$$\sum_{I=1}^{N} m_i / MN$$

where N is the number of prints in the database.

Embodiment Two

Figure 4:
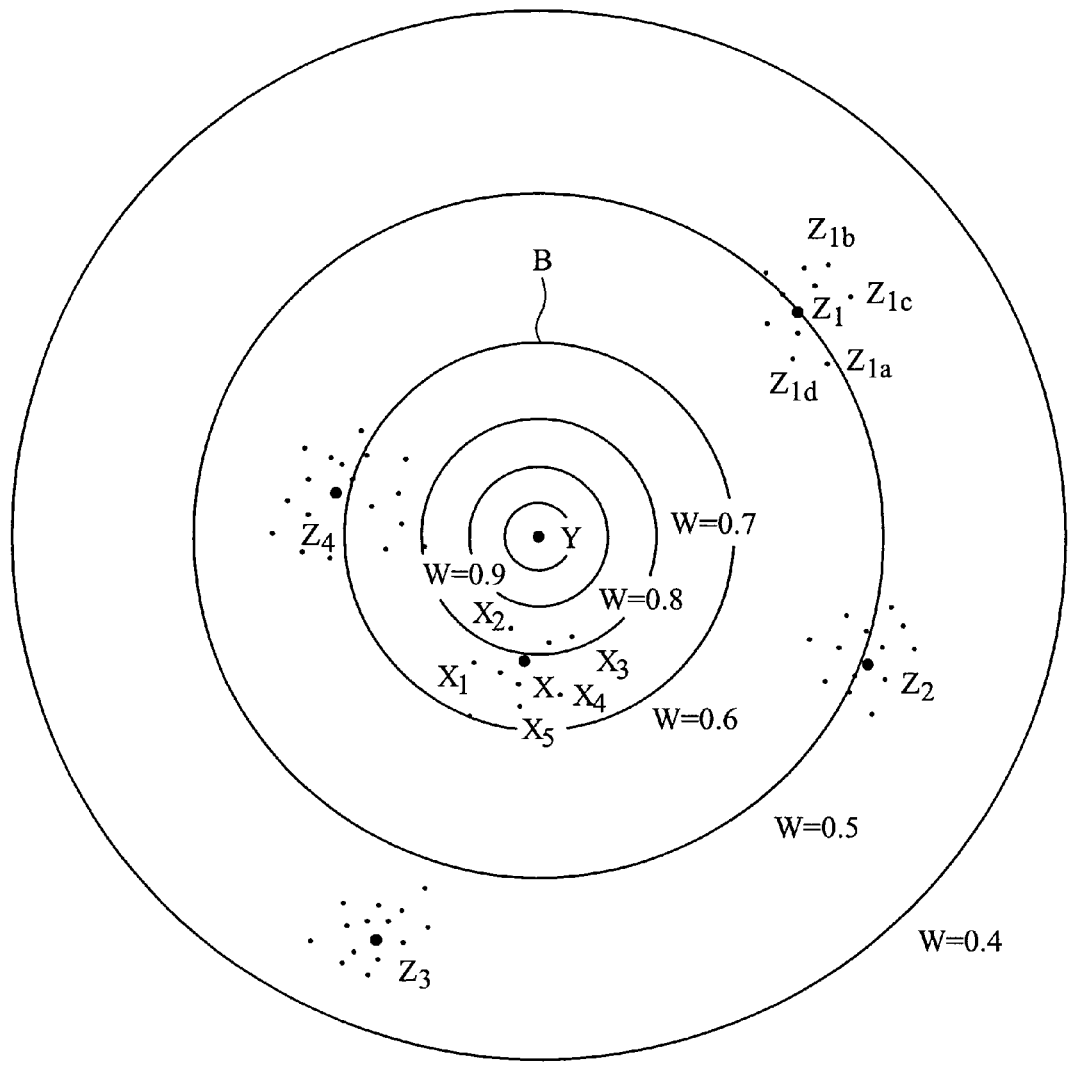
FIG. 4 is a schematic illustration useful for understanding the implementation of the present invention in an alternative embodiment, showing the population of space with points representing an identifier representation and distorted versions thereof.

In an alternative approach of the present invention a variation on the above methodology of Embodiment One is used. FIG. 4 provides a figurative illustration useful for understanding that methodology.

An identifier representation is obtained from a finger and expressed as a point in space, $z_1$. Various approaches can be taken to the collection, processing and expression of the identifier representation, with the approach detailed in WO2006/085094 being preferred. Details of this approach are provided in Appendix A below.

The possible variation in this identifier representation between repeat samplings from the same finger is then considered. In effect, the impact of distortion upon the source is considered. This results in a cluster of further points, $z_{1a}$, $z_{1b}$, $z_{1c}$, $z_{1d}$ etc around point $z_1$. This differs significantly from the prior art, where $z_1$ only is considered and no repeat samplings of $z_1$ are considered. A small number of such points are shown in FIG. 2 to represent the position schematically, but a large number of such points can be obtained.

It is possible to obtain the identifier representation behind each point experimentally from the finger by repeated sampling without controlling the manner in which the finger is sample (hence distortion will occur). However, the applicant has developed an automated technique for simulating the effect of distortion which is far quicker to implement than a physical sampling approach. Details of this technique are set out in the Appendix B below.

This process is repeated for a large number of different identifier representations obtained from different fingers of different people so as to provide a large number of different first points, z. In the schematic illustration of FIG. 4, further identifier representations $z_2$, $z_3$ and $z_4$ are employed to generate point clusters $z_{b1}$, $z_{b2}$, $z_{b3}$; $z_{c1}$, $z_{c2}$, $z_{c3}$; $z_{d1}$, $z_{d2}$ etc about their respective points, z. This gives a significant increase in the number of points compared with the prior art mentioned above. Rather than just having the number of points $z_1$ to $z_n$, the number of point is multiplied by the number of samplings of each point, $z_{11}$ to $z_{1n}$.

In this space, it is then possible to consider the two identifier representations of interest, which in this example are a fingerprint taken from a person, a suspect in a crime, and a fingerprint taken from a crime scene.

The fingerprint from the crime scene is used to generate a identifier representation which is then expressed as a point, y. No distortion of this point y needs to be simulated and no further points clustered around it are needed.

The fingerprint from the suspect is also used to generate a identifier representation and hence a point, x. A set of points $x_1$, $x_2$, $x_3$ etc clustered around this point x are then generated, preferably by the same approach as is taken to generate the clusters around the points $z_1$, $z_2$ etc.

The distance between point y and each of the points for a cluster is then established.

Thus for cluster $z_1$ in FIG. 4, distances y to $z_{1a}$; y to $z_{1b}$; y to $z_{1c}$; y to $z_{1d}$ etc are all established. Distances are established in a similar way between y and the other points, $z_{2a}$, etc. Hence, a far greater number of y to z distances are taken. Referring to FIG. 3, the variation in these distances (y to z) and the frequency of occurrence gives a probability distribution 20. This is a fairly widespread distribution reflecting the wide variety of fingerprints which are behind the identifier representations for which the distance z to y has been established.

Figure 5:
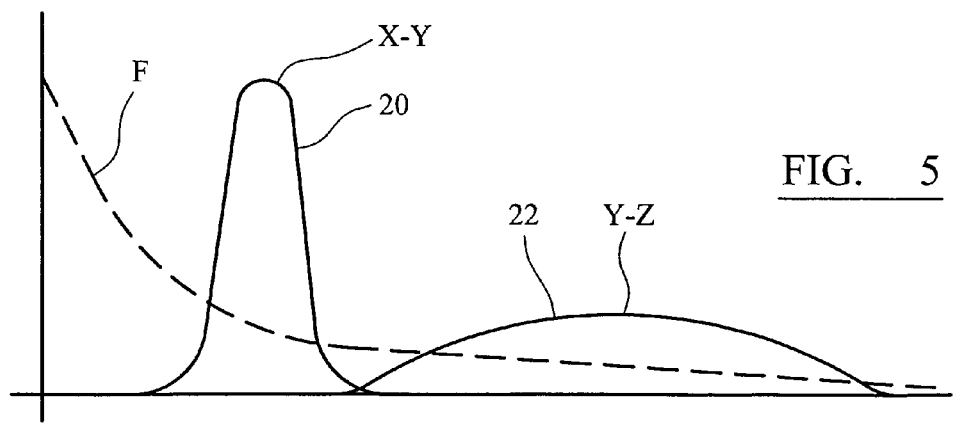
FIG. 5 is an illustration of the form of probability distributions involved in the alternative embodiment of the present invention.

In a similar manner, the distance between point y and each of the points for the cluster about point x is also established. Thus distances y to x; y to $x_1$; y to $x_2$ etc are all established. In the prior art mentioned above, the x to x distances are considered. Referring to FIG. 5, the variation in these distances and their frequency of occurrence give a probability distribution 22. This is a more tightly defined distribution reflecting the single fingerprint which is behind all the identifier representations for which the distance to m has been established.

The variation in the methodology when compare with Embodiment One arises in the manner of weighting the relative distances x to y and z to y.

In Embodiment One, the weighting is an all or nothing weighting. Distances x to y and z to y which are <T count in the LR determination. Distances x to y and z to y which are >T are discounted from the LR determination. This is done by the provision of the bin B around point y at distance T. This approach can be less attractive when dealing with a situation where the representation behind point y is highly distorted and/or the source of point y and point x are different. The occurrence of a sero count within the bin B can be a problem in giving a division by zero occurrence.

In this Embodiment, a variable function is used to provide the weighting for all of the distances. In the figurative illustration of FIG. 4, the continuous nature of the weighting is reflected by a series of weighting contours W positioned about point y. In the illustration, different contours W have different weightings, with those weightings decreasing with distance from point y. Thus smaller distances from point y will have a higher weighting applied than the larger distances from point y.

The variable function F is more realistically shown in the illustration of FIG. 5 which features the x to y distance distribution X-Y and the y to z distance distribution Z-Y. As can clearly be seen the variable function F has a high value for shorter distances and a decreasing value for longer distances.

The variable function F can be used to provide a weighing value for each count according to the distance of that count. The weighted values can then be summed for all counts of a type and for each type. The comparison of the summed values relates to the LR resulting.

The above approach can also be expressed mathematically, as follows. The likelihood ratio, LR, of interest is effectively the probability of the first mark, and its identifier representation represented by point x, and the second mark, and its identifier representation represented by point y, occurring given the prosecution's hypothesis, $H_p$, (normally the crime scene mark, y, came from the suspect whose fingerprint was used to generate x, $x_1$ etc) and given other relevant information to the case, I, to the probability of x and y, occurring given the defences's hypothesis, $H_p$, (normally the crime scene mark, y, came from someone other than suspect whose fingerprint was used to generate x, $x_1$ etc) and given other relevant information to the case, I. This can be expressed as:

$$LR = \frac{p(x, y \mid H_p, I)}{p(x, y \mid H_d, I)}$$

This function can be expressed as:

$$LR = \frac{p(y \mid x, H_p, I)}{p(y \mid x, H_d, I)} \cdot \frac{p(x \mid H_p, I)}{p(x \mid H_d, I)}$$

The following assumptions are now made:

$$p(x \mid H_p, I) = p(x \mid H_d, I)$$

$$p(y \mid x, H_d, I) = p(y \mid H_d, I)$$

Provided these are true:

$$LR = \frac{p(y \mid x, H_p, I)}{p(y \mid H_d, I)}$$

By changing the notation slightly, this can be reexpressed as:

$$LR = \frac{p(Y = y \mid X = x, H_p, I)}{p(Y = y \mid H_d, I)}$$

This in turn can be approximated by the form:

$$LR = \frac{N Pr(y^{(k)} \mid x^{(k)})}{\sum_{i=1}^{N} Pr(y^{(k)} \mid z_i^{(k)})}$$

where N is the number of identifier representations in the reference database, k is the number of minutiae considered for an identifier representation. The numerator and the denominator can be determined from the consideration of the respective distances against the probability distributions.

As mentioned above, the probabilities obtained from the respective distances are subject to weighting according to the provided by the variable function F.

The variable function F can have a variety of possible forms and may be optimised for the context of a particular consideration. In one form, the variable function may be defined by the mean of a beta distribution and an exponential distribution. This may take the form:

$$f(d) = \frac{\left[\frac{\text{beta}(d, \lambda, T_1)}{\text{beta}(\lambda, T_1)}\right] + \exp\left[\frac{-d, \lambda}{T_1}\right]}{2}$$

where d is the distance, $\lambda$ is a numerical value and $T_1$ is the value of the distance between point x and point y.

Appendix A—Detailing Generation of Identifier Representations

As mentioned above, for the required processing, the necessary data from representations must be extracted in a way which accurately reflects the configuration of the fingerprint present, but which is suitable for use in the comparison process.

It is possible to fix coordinate axes to the representation and define the features/directions taken relative to that. However, this leads to problems when considering the impact of rotation and a high degree of interrelationship being present between data.

Instead of this approach, three features, such as a bifurcation feature or ridge end can be selected to form nodes which are then joined to one another so that a triangle is formed. Extrapolation of this process to a larger number of minutia features gives a large number of triangles. A print can typically be represented by 50 to 70 such triangles. The Delauney triangulation approach is preferred.

In the alternative approach, a series of features are identified within a representation. A number of approaches can be used to identify the features to include in a series. Firstly, it is possible to identify all features in the representation and join features together to form triangles (for instance, using Delauney triangulation). Having done so, one of the triangles is selected and this provides the first three features of the series. One of the adjoining triangles to the first triangle is then selected at random and this provides a further feature for the series. Another triangle adjoining the pair is then selected randomly and so on until the desired number of features are in the series. In a second approach, a feature is selected (for instance, at random) and all features within a given radius of the first feature are included in the series. The radius is gradually increased until the series includes the desired number of features.

Having established the series of features, the position of each of these features is considered and used to define a centre. Preferably this is done by considering the X and Y position of each of the features and obtaining a mean for each. The mean X position and mean Y position define the centre for that group of features. Other approaches to the determination of the centre are perfectly useable. Instead of defining triangles with features at each apex, the approach uses the centre as one of the apexes for each of the triangles. The other two apexes for first triangle are formed by two other features. The next triangle is formed by centre and two feature and so on. Other triangles are formed in a similar way, preferably moving around the centre in sequence. The set of triangles formed in this approach is unique, simple and easy to describe data set. The approach is more robust than the Delauney triangulation described previously, particularly in relation to distortion. Furthermore, the improvement is achieved without massively increasing the amount of data that needs to be stored and/or the computing power needed to process it.

Either the first, Delauney triangulation, based approach or the second, radial triangulation, approach extract data which is suitable for formatting according to the preferred approach of the present process.

Appendix B—Detailing Simulation of Distortion

Instead of physically sampling a large number of individuals, under various conditions and with repeats thereof, to mirror the distortion likely to be seen, the alternative approach discussed above simulates a large number of specific distorted representations from an undistorted representation. The undistorted representation is easy to collect or could even be obtained from one of a number of existing identifier representations of such representations. The actual generation of the specific distorted representations is performed by a computer and so is quick to perform on a large scale. The simulation is repeated on a large number of undistorted representations.

To be able to distort undistorted representations in an appropriate way, it is necessary to derive an appropriate description of the distortion process. To do this, the approach involves an initial investment in further physical representations of distortion. A significant number of individuals, for instance 40, are used to provide a significant number of distorted representations of their fingerprints, for instance 50 each. For each individual, their representations and the distortion of them are then described using a non-linear mathematical transformation. Such an approach is more accurate than some prior approaches as the nature of the distortion itself is non-linear. In the preferred form the approach establishes a matrix which describes the distortion. An example of such a matrix description of distortion is to be found in Ross et al., *Proceedings of the International Conference on Biometric Authentication (ICBA)* Hong Kong, July 2004 "*Estimating Fingerprint Deformation*" the contents of which are incorporated herein by reference.

Starting with a pair of representations, these are presented in a black and white format, preferably skeletonised and subjected to appropriate cleaning and healing of the representation. The minutiae locations are then determined and information on them collected for each representation using a suitable information format. The location in the representation and orientation of the associated ridge and grayscale intensity of pixels in the vicinity may be captured in this way. The degree of correspondence between minutiae in the two representations can then be obtained and quantified using one or more techniques, such as an elastic stringer matcher. Ridge curves can be extended from these points and the degree of correspondence between points on the curves established too.

The global effect of different distortions between the different representations on these points is then considered. The Thin Plate Spline approach describes the dependence of point positions on a thin metal plate with the physical bending energy applied to the thin metal plate. The Thin Plate Spline approach is a parametric generalisation from rigid to mild non-rigid deformations. The parameters of the Thin Plate Spline approach can be obtained from a matrix equation and various approaches to the solution of the equation can be taken. An average deformation model can be obtained from the technique.

In the Ross et al., paper, a number of representations of a marker of a particular individual are taken. These are taken under generally similar but uncontrolled conditions and so reflect the common extent of variation for that marker of that individual. The results are used to form the average deformation model for that individual. The average deformation model can be considered as modelling the behaviour of the individual. The average deformation model is used to distort the representation or "baseline impression" of a particular individual before that is compared with the other, template representation of a particular individual. As a result, the comparison process is improved. No use of the distorted representation is made outside of the one representation versus another representation comparison for a particular individual. If another individual is to be considered, then representations must be collected for him, an average deformation model for that individual must be generated and that individual's own average deformation model is used in any comparison. Each model is individual specific, therefore, and the model for one individual may be very different to the model for another.

The approach differs from Ross et al in a number of ways, including because the matrix arrived at for specific distortion of an individual is considered together with the matrices arrived at from corresponding distortions of a number of other individuals so as to provide a composite matrix descriptive of distortion in a more general sense. The model of deformation is not specific to an individual, therefore, but instead is applicable between individuals. The modelling of distortion according to the invention can address distortion as a whole, but more preferably a number of different models to cover different directions of distortion are generated. For instance, a model for distortion of the top of the representation can be determined and/or a model for distortion to one side and/or another and/or the bottom can be determined. The models can be used individually and/or together.

The composite matrix which results provides a detailed and appropriate expression of how specific distortion alters representations in general. As such, it is then possible to take an undistorted representation from an individual, who has not provided distorted representations which have been physically collected and considered, and simulate a series of distorted representations for that representation. Repeat uses of the distortion matrix gives repeat distorted representations. All these are useful in terms of contributions to the identifier representation on between representation variability for the same finger and/or person. The approach can equally well be applied to a set of ten representations collected with one representation for each finger of the person.

Whilst a number of non-linear mathematical transformations are possible, and a number of matrix based approaches are possible, the preferred matrix form is achieved using a Thin Plate Spline approach referenced above. Many variations on that particular way of describing the distortion are possible, however.

The general deformation model obtained from the same individual may be used, but it is preferred to use a composite general deformation model obtained by considering a plurality of individuals, who may or may not include the particular individual being considered. This approach represents another use of a identifier representation quickly generated by the present invention.

The invention claimed is:

1. A computer implemented method of comparing a first representation of an identifier with a second representation of an identifier, wherein the identifier is a biometric identifier or a form of identifier specific to a person or item, and in which the first representation and second representation is a fingerprint, palm print, ear print, retina image, footprint, shoe print, tool mark, or a part of any of these, the method comprising:
converting the first representation to an expression of the first representation, wherein the expression of the first representation is a sub-set of the data contained within the first representation;
generating one or more variant expressions from the expression of the first representation, wherein the one or more variant expressions are generated from the expression of the first representation to simulate the effect of a source of variation upon the expression of the first representation;
converting the second representation to an expression of the second representation, wherein the expression of the second representation is a sub-set of the data contained within the second representation;
providing a plurality of other representations and converting each of the other representations to an expression of the other representations, wherein the expressions of the other representations are a sub-set of the data contained within those other representations;
generating one or more variant expressions from each expression of the plurality of other expressions, in which the expressions of the other representations are a sub-set of the data contained within those other representations;
defining a boundary with respect to the expression of the second representation, the boundary defining a space inside the boundary;
determining a first value, the first value being an expression of the number of the variant expressions of the expression of the first representation within the space defined by the boundary;
determining a second value, the second value being an expression of the number of variant expressions of the expressions of the other representations within the space defined by the boundary;
determining a measure of comparison between the first representation of the identifier and the second representation of the identifier from the first value and the second value, in which the measure of comparison is the ratio of the first value to the second value.

2. A method according to claim 1 wherein the first representation is obtained from a known person and/or the second representation is obtained from an unknown person.

3. A method according to claim 1 wherein the other representations are obtained from a sample of a population.

4. A method according to claim 1 wherein the source of variation is distortion of the identifier during the generation of the representation.

5. A method according to claim 1 wherein the variant expressions are generated experimentally and/or the expression is used to automatically generate the variant expressions via a simulation method.

6. A method according to claim 1 wherein the variant expressions for the other representations are pre-generated and the variant expressions are stored in a memory.

7. A method according to claim 1 wherein the boundary is provided around the expression of the second representation.

8. A method according to claim 1 wherein the boundary has the same extent about the expression of the second representation in two or more dimensions.

9. A method according to claim 1 wherein the boundary has a different extent about the expression of the second representation in one or more dimensions.

10. A method according to claim 1 wherein the method includes determining a relationship between one or more of: the expression of the second representation and the expression of the first representation; and/or the expression of the second representation and one or more of the variant expressions of the expression of the first representation; and/or the expression of the second representation and the expression of one or more of the other representations; and/or the expression of the second representation and one or more of the variant expressions of one or more of the expressions of the other representations; potentially, for one or more of these pairings.

11. A method according to claim 10 wherein the relationship is a distance between the expressions.

12. A method according to claim 1 wherein the method includes establishing a first probability distribution for one or more of: the expression of the second representation and the expression of the first representation; and/or the expression of the second representation and one or more of the variant expressions of the expression of the first representation.

13. A method according to claim 1 wherein the method includes establishing a second probability distribution for one or more of: the expression of the second representation and the expression of one or more of the other representations; and/or the expression of the second representation and one or more of the variant expressions of one or more of the expressions of the other representations; potentially, for one or more of these pairings.

14. A method according to claim 1 wherein the first probability distribution relates to the variation between expressions and/or variant expressions from the same identifier.

15. A method according to claim 1 wherein the second probability distribution relates to the variation between expressions and/or variant expressions from different identifiers.

16. A method according to claim 1 wherein the first value is an expression of the proximity of the expression and/or variant expressions of the first representation to the expression of the second representation.

17. A method according to claim 1 wherein the first value is an expression of the proportion of the expression and/or variant expression of the first representation within the space defined by the boundary.

18. A method according to claim 17 wherein the expression of the proportion is compared with the total number of expression and/or variant expressions for the first representation.

19. A method according to claim 1 wherein the first value is the number of expression and/or variant expressions of the first representation within the space defined by the boundary divided by the total number of expression and/or variant expressions for the first representation.

20. A method according to claim 1 wherein the second value is an expression of the proximity of the expression and/or variant expressions of the other representation to the expression of the second representation.

21. A method according to claim 1 wherein the second value is an expression of the proportion of the expressions and/or variant expressions of the other representations within the space defined by the boundary.

22. A method according to claim 21 wherein the expression of the proportion is compared with the total number of expressions and/or variant expressions for the other representations.

23. A method according to claim 1 wherein the second value is the number of expressions and/or variant expressions of the other representations within the space defined by the boundary divided by the total number of expressions and/or variant expressions for the other representations.

24. A method according to claim 1 wherein the measure of comparison is a likelihood ratio and the likelihood ratio is the quotient of two probabilities, the numerator being the probability the first representation and second representation originate from the same identifier, the denominator being the probability of the first representation and second representation originate from different identifiers.

25. A method according to claim 1 wherein the measure of comparison provides an indication as to whether the first representation is likely to have the same source as the second representation.

26. A method according to claim 25 wherein the indication as to whether the first representation is likely to have the same source as the second representation is a yes or no indication and/or a quantified indication.

27. A method according to claim 1 wherein the measure of comparison is used to provide a decision for an access control apparatus and/or the measure of comparison is used to provide evidence for legal proceedings and/or the measure of comparison is used to provide evidence or information linking one item and/or location and/or person to another item and/or location and/or person.

28. An apparatus for comparing a first representation of an identifier with a second representation of an identifier, wherein the identifier is a biometric identifier or a form of identifier specific to a person or item, and in which the first representation and second representation is a fingerprint, palm print, ear print, retina image, footprint, shoe print, tool mark, or a part of any of these, the apparatus comprising:

an input channel configured to receive an expression of the first representation, wherein the expression of the first representation is a sub-set of the data contained within the first representation, and optionally a unit adapted to convert the first representation into an expression of the first representation;

a data processor configured to generate one or more variant expressions from the expression of the first representation, wherein the one or more variant expressions are generated from the expression of the first representation to simulate the effect of a source of variation upon the expression of the first representation;

wherein the input channel is configured for receiving an expression of the second representation, wherein the expression of the second representation is a sub-set of the data contained within the second representation, and optionally a unit adapted to convert the second representation to an expression of the second representation;

wherein the input channel is configured for receiving and/or data storage unit for storing an expression of a plurality of other representations, wherein the expressions of the other representations are a sub-set of the data contained within those other representations, and optionally a unit adapted to convert the plurality of other representations into expressions of the other representations;

wherein the data processor is configured to generate one or more variant expressions from each expression of the plurality of other expressions, wherein the one or more variant expressions are generated from each expression of the other representations to simulate the effect of a source of variation upon each expression of the other representations;

wherein the data processor is configured to calculate and/or to obtain from a data storage unit a definition of a boundary with respect to the expression of the second representation, the boundary defining a space inside the boundary;

wherein the data processor is configured to determine a first value, the first value being an expression of the number of the variant expressions of the expression of the first representation within the space defined by the boundary;

wherein the data processor is configured to determine a second value, the second value being an expression of the number of variant expressions of the expressions of the other representations within the space defined by the boundary;

wherein the data processor is configured to determine a measure of comparison between the first representation of the identifier and the second representation of the identifier from the first value and the second value, wherein the measure of comparison is the ratio of the first value to the second value, and optionally an output channel for expressing the measure of comparison.

29. Apparatus according to claim 28, wherein the data processor has a stored algorithm to generate the variant expressions from the first representation and/or plurality of other representations.

30. Apparatus according to claim 28, wherein the unit adapted to convert the first representation into an expression of the first representation and/or the unit adapted to convert the second representation into an expression of the second representation and/or the unit adapted to convert the plurality of other representations into expressions of the plurality of other representations includes an image scanner and/or the unit and/or device include a user interface and/or the unit and/or device include a data storage unit to provide a record of the selected features and/or the device includes an output unit for producing a record of the selected features.

* * * * *